United States Patent [19]

Hindström

[11] Patent Number: 4,956,088
[45] Date of Patent: Sep. 11, 1990

[54] METHOD AND APPARATUS FOR PRESSURIZED DEWATERING

[75] Inventor: Rolf Hindström, Turku, Finland

[73] Assignee: Outokumpu Oy, Finland

[21] Appl. No.: 348,961

[22] Filed: May 8, 1989

[30] Foreign Application Priority Data

May 6, 1988 [FI] Finland ............................ 882128

[51] Int. Cl.⁵ .......................................... B01D 29/80
[52] U.S. Cl. ........................................ 210/327; 34/95;
210/331; 210/406; 210/486; 210/510.1
[58] Field of Search ............... 210/231, 331, 404, 406,
210/416.1, 770, 784, 808, 396, 325, 327, 330,
486, 510.1, 345, 346; 418/97, DIG. 1; 34/9, 95

[56] References Cited

U.S. PATENT DOCUMENTS

| 1,524,916 | 2/1925 | Demme .............................. 210/808 |
| 3,452,874 | 7/1969 | Keller et al. ........................ 210/404 |
| 4,092,247 | 5/1978 | Madsen ............................... 210/406 |
| 4,116,831 | 9/1978 | Keat .................................... 210/808 |
| 4,169,794 | 10/1979 | Badino ................................ 210/330 |
| 4,255,264 | 3/1981 | Madsen ............................... 210/406 |
| 4,292,177 | 9/1981 | Stahl et al. .......................... 210/325 |
| 4,357,758 | 11/1982 | Lampinen ............................ 34/95 |
| 4,856,204 | 8/1989 | Hindstron ............................ 34/95 |
| 4,863,656 | 9/1989 | Hindstrom .......................... 210/331 |

FOREIGN PATENT DOCUMENTS

| 770437 | 10/1967 | Canada ................................ 210/327 |
| 2947329 | 5/1981 | Fed. Rep. of Germany ...... 210/808 |
| 3016753 | 11/1981 | Fed. Rep. of Germany ...... 210/808 |
| 53-64949 | 6/1978 | Japan ................................... 210/808 |
| 3007805 | 1/1988 | Japan ................................... 210/345 |
| WO88/07402 | 10/1988 | PCT Int'l Appl. ................. 210/406 |
| 663419 | 5/1979 | U.S.S.R. .............................. 210/406 |
| 955985 | 9/1982 | U.S.S.R. .............................. 210/406 |
| 959804 | 9/1982 | U.S.S.R. .............................. 210/808 |

Primary Examiner—Frank Spear
Assistant Examiner—Joseph Drodge
Attorney, Agent, or Firm—Steinberg & Raskin

[57] ABSTRACT

A filtering method in which an object to be filtered and dewatered is brought through a finely porous suction face saturated with liquid, into hydraulic connection with a liquid situated under a negative pressure relative to the object to be dewatered. The filter plate or equivalent and the material to be filtered which adheres to the plate by the liquid suction, are surrounded by a pressure-tight cover. A positive pressure relative to atmospheric pressure is introduced into this cover, by which removal of liquid out of the material to be filtered is intensified. A device for providing such filtration is also provided.

4 Claims, 4 Drawing Sheets

METHOD AND APPARATUS FOR PRESSURIZED DEWATERING

BACKGROUND OF THE INVENTION

The present invention concerns a filtering method and a device for use in this method.

More particularly, the present invention concerns an improvement in a filtering method, in which an object to be dewatered or filtered in brought, through a finely porous suction face saturated with liquid, into hydraulic contact or connection with a liquid placed under a negative pressure relative to the object to be dewatered. In the concerned method, a particular finely porous suction face is used, with which the object to be dewatered is brought into direct contact or connection. In the method, the diameters of the fine pores in the filter plate are primarily within the range of about 0.05 to 2 microns.

SUMMARY OF THE INVENTION

Accordingly, it is an object of the present invention to provide an improvement of the filtering method noted above.

It is a further object of the present invention to provide filtering equipment by means of which it is possible to filter large quantities of material both rapidly and efficiently.

These and other objects are attained by the present invention which is directed to a method for filtering, comprising the steps of placing material to be filtered into hydraulic contact with liquid under negative pressure relative to the material, through a finely porous suction face saturated with liquid, whereby the material to be filtered adheres to the suction face, surrounding the suction face and material adhering to the same by liquid suction with a pressure-tight cover, and introducing into this cover a positive pressure, whereby removal of liquid out of the material to be filtered is intensified. The liquid is preferably water or includes water, while the porous suction face is preferably on at least one porous filter plate. Furthermore, the positive pressure is positive relative to atmospheric pressure.

The present invention is also directed to apparatus for filtering, which comprises at least one filter plate having a finely porous suction face arranged to be brought into contact with material to be filtered, saturated with liquid, and hydraulically connected with liquid under negative pressure relative to the material to be filtered. A pressure-tight cover surrounding the at least one filter plate is provided, which defines a space into which positive pressure can be introduced for accelerating removal of liquid out of the material to be filtered. The liquid is preferably water or includes water, while means for introducing the positive pressure into the interior of the cover, are preferably provided.

The method in accordance with the present invention is principally characterized by the filter plate or equivalent and the material to be filtered and adhering to the plate by means of liquid suction, being surrounded by a pressure-tight cover, with a positive pressure relative to atmospheric pressure being introduced into this cover, by means of which the removal of the liquid out of the material to be filtered is intensified. The equipment in accordance with the present invention is principally characterized by a pressure-tight cover which encloses the filter plates, and into an interior of which a positive pressure can be introduced, whereby the filtering and the removal of the liquid out of the material to be filtered and dewatered is accelerated.

In the method of the invention, the positive pressure is introduced into the pressure space situated above the material suspension. The filter plates situated in the pressure space are advantageously ceramic filter plates. By the effect of the negative pressure introduced into the interiors of the plates, the material to be filtered adheres to the faces of the filter plates.

The pressure difference across the filtered material can be increased by introducing a positive pressure, which is positive expressly in relation to the atmospheric pressure, outside of the filter plates. According to the invention, the space of positive pressure is formed by surrounding the group of plates that is rotated by means of a cover construction which is pressure-tight. In a preferred embodiment of the invention, a shield-gas or vapor atmosphere that is at a positive pressure relative to the atmospheric pressure, is introduced into the pressure space. This shield-gas or vapor atmosphere prevents reactions of oxygen with the material to be filtered, and in this manner, e.g., the formation of undesirable carbonates is prevented, which blocks the filter face rapidly in conventional constructions.

In the following, when positive pressure and negative pressure are described, the normal atmospheric pressure is considered as the reference level.

BRIEF DESCRIPTION OF THE DRAWINGS

The present invention will be described in greater detail below, with reference to certain advantageous embodiments thereof illustrated in the accompanying drawings, and to which, however, the present invention is not intended to be confined. In the drawings.

DESCRIPTION OF THE PREFERRED EMBODIMENTS

Figures 1, 2:
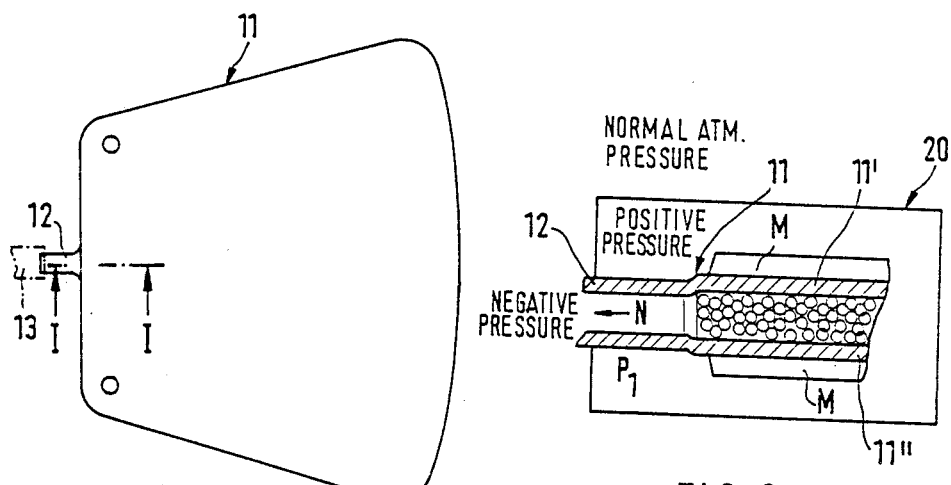
FIG. 1 illustrates a filter plate used in the method of the present invention.
FIG. 2 is a sectional view along line I—I of FIG. 1, illustrating a suction face used in the method of the present invention (the method will be described on the basis of this particular illustration)

FIG. 1 illustrates a filter plate 11 used in the method and device in accordance with the present invention. The filter plate 11 is viewed from above. Advantageously, the equipment has a number of filter plates circumferentially mounted. Each plate 11 comprises a connecting duct 13, which communciates with a central suction pipe 12. Through the ducts 12 and 13, liquid suction is applied to the finely porous filter face 11', 11" of the plate 11.

FIG. 2 is a schematic illustration of the method of the present invention. The filter equipment 10 comprises one or several filter plates 11. Advantageously, the filter plates are made of ceramic material. The plates comprise a finely porous structure, whose pore size, i.e. the radius of the pores, is primarily within the range of about 0.05 to 2 microns. As illustrated in FIG. 2, the material M to be filtered is passed into contact with the filter plate 11 in the manner illustrated in FIG. 4, onto both outer faces 11' and 11" of the filter plate 11. The filter plate 11 is saturated with liquid, e.g. water, and the water in the filter plate 11 communicates with a liquid space N passed into communication with the filter plate 11, this liquid space N being further subjected to a considerable negative pressure, e.g. by means of a pump.

The microcapillaries in the filter plate 11 however, are not emptied in spite of the negative pressure, because the surface forces between the water and the filter plate 11 prevent it. If the radius of the largest pore in the filter plate 11 is R, then the water holding capacity of the filter plate 11, i.e. the highest negative pressure $\Delta p$ that can be set for the water while the plate still remains saturated with water, can be calculated from the following formula:

$$\Delta p = \frac{2\gamma \cos \theta}{R} \quad (I)$$

wherein $\gamma$ = surface tension of water, and $\theta$ = contact angle between the water surface and the filter face. By means for formula (I), it is ascertained that, if the radius of a pore is 1.2 microns and the contact angle 30°, then the maximum negative pressure for water at 20° C. is 1 bar ($\gamma = 70 \times 10^{-3}$ N/m).

When a porous object of dewatering is situated onto the filter plate, then the water situated in the filter plate and the water present in the material to be filtered, form a unified layer of water. Since the pressure of the water present in and underneath the filter plate is low, water begins flowing out of the material to be filtered through the filter plate 11. The flow of water stops when the material M to be filtered has become so dry, that the pressure of the water present therein is equal to the pressure of the water situated underneath the filter plate.

The finer the filter plate or any other porous plate, the higher the negative pressures which can be introduced without having to worry about the pores in the filter plate becoming empty, and also the higher the dryness of the material to be filtered that is achieved.

By means of the method of the invention, the material to be filtered can be completely dewatered without thermal drying. For example, if the air pressure is set at 2 bars instead of one bar, it is ascertained that, when the absolute pressure of the water is 0.1 bar, theoretically it is possible to reach the value $u_v = 0.08$. Such an arrangement requires that the filter plate is so finely porous that its water holding capacity $\Delta p \geq 1.9$ bars, i.e. $R \leq 0.6$ microns if $\theta = 30°$. The pressure of saturated water at 20° C. is 0.023 bar. A pressure lower than this cannot be set for water, because in such a case the water starts boiling.

In the method of the invention, the filtration is intensified by introducing a positive pressure into the pressure space above the filtration material basin. In this manner, it is possible to increase the difference in pressure across the filtration material, and thereby to accelerate the filtering and the dewatering of the material to a remarkable extent. By means of the introduction of positive pressure in accordance with the present invention, it is also possible to dewater the material more thoroughly to minimize the final moisture that remains in the material.

A table is given below concerning the effect of difference in pressure across the filtration material on the required pore size in material of the filter plate 11. Depending upon the difference in pressure, the filter plate 11 must be chosen so that with the difference in pressure concerned, the filter plate also remains saturated with water. The higher the difference in pressure across the material to be filtered, the small the pore size that is required from the filtration material. On the other hand, as the pore size becomes smaller, the filtration result is improved.

TABLE I

| Difference in pressure (kPa) across material to be filtered | Pore size ($\mu$m) 0 diameter |
|---|---|
| 98 | 2.9 |
| 125 | 2.2 |
| 150 | 1.9 |
| 200 | 1.4 |
| 250 | 1.1 |

Figure 3:
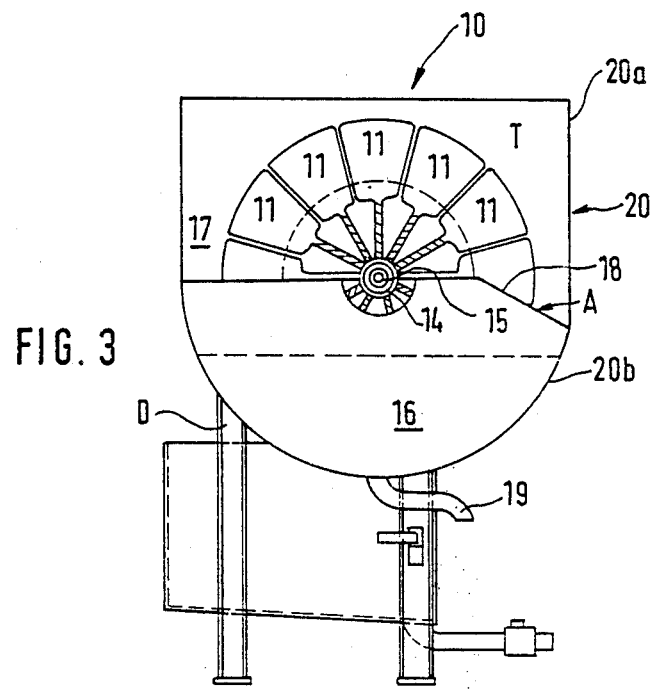
FIG. 3 is a side view illustrating principles of equipment utilized in the method of the present invention.

FIG. 3 is a partial schematic side view of the device used in the method of the present invention. The device 10 preferably comprises a number of filter plates 11. The plates 11 are mounted in circumferential form, so that the duct 12 of each plate 11 communicates with a central suction pipe 14, which is situated on a shaft 15 of rotation.

Each filter plate 11 communicates with the central pipe 14 through a connecting duct 13. The plates 11 are fitted so as to pass through a basin 16. The basin 16 may be filled, e.g., with peat sludge or with any other, corresponding material to be dewatered or filtered. Negative pressure is passed into the filter plates 11 through the central pipe 14 and the ducts 13.

Due to the porous structure of the filter plates 11, the sludge to be dewatered and filtered present in the basin 16 from which the liquid is intended to be removed, is carried by the effect of the negative pressure applied to the middle of the filter plates 11 into contact with the suction faces 11' and 11" of the plates 11. The water contained in the sludge is suctioned further by the effect of the negative pressure through the suction faces 11' and 11" of the filter plates 11 and into an interior space in the plates 11 and further along separate ducts 13, 14 out of the device.

Since the filter plates 11 are mounted circumferentially around the central pipe or shaft 15 and as the shaft 15 is fitted to revolve, being driven by a motor, each filter plate 11 is, in turn, displaced into the basin 16 and further rises out of the basin 16 as the shaft of rotation 15 revolves. By the effect of the negative pressure applied to the filter plates 11, material to be dewatered which adheres to the outer faces of the filter plates 11 rises along with the filter plates 11 out of the basin 16 into the space 17 above the sludge. When negative pressure is maintained, the dewatering and filtration of the material continues during the rising movement.

After the material to be dewatered, e.g. peat, has been carried, e.g. to point A illustrated in FIG. 3, scraping by the arrows $c_2$. Furthermore, the rotor part 25b is situated to glide ($L_2$) against the stator part 25a of the valve 25.

Figure 5:
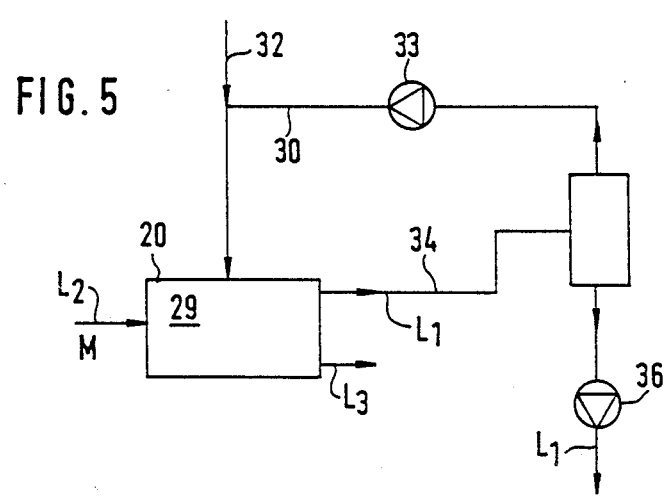
FIG. 5 is a block diagram illustrating the method and equipment in accordance with the present invention.

FIG. 5 is a block diagram illustrating the method of the present invention. The illustration is schematic and illustrates principles. The positive pressure is generated in the interior space 29 in the cover 20, by means of a compressor 33. The compressor pump 33 pumps the positive pressure into the space 29 through a duct 30. In the space 29, a certain positive pressure is maintained and, for example, in the case of measurement of pressure, if the pressure becomes lower in the space 29, the necessary pressure increase is pumped by means of the compressor 33.

In the preferred embodiment of the invention, a vapor atmosphere is used in the space 29. Such an embodiment of the invention is also possible in which air or some shield gas, such as nitrogen, is utilized. When use of oxygen is avoided, undesirable reactions of oxidation are also avoided. When necessary, additional gas, in the case of vapor atmosphere additional steam, is applied along duct 32 into the space 29. In FIG. 5, the reference numeral 34 denotes a duct through which the liquid is suctioned out of the material to be filtered. The liquid pump 36 is fitted to suction the liquid out of the material to be filtered. The liquid is removed as filtrate liquid in the manner indicted by the arrow $L_1$ in FIG. 5. The material M to be filtered is passed in the manner indicated by the arrow $L_2$ into the cover 20, and the filtered and dewatered material M' is removed in the manner indicated by the arrow $L_3$ out of the interior of the cover 20.

Figure 6:
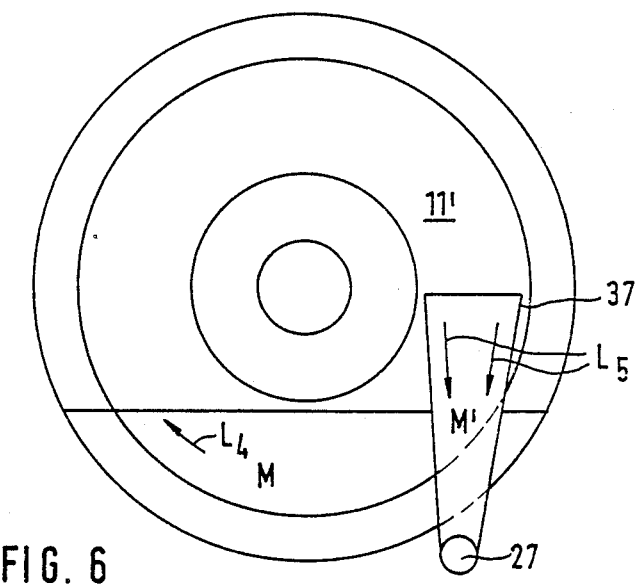
FIG. 6 is a schematic illustration of operation of doctors in the equipment of the present invention and of collecting and removal of filtered material out of a filtrate space, seen principally in the direction of arrow $K_2$ in FIG. 4C.

FIG. 6 illustrates an embodiment for the removal of filtered material off faces of the filter plates 11. The doctor 37 detaches the filtered material M at the point A from the face 11' of the filter plate 11. When the plate 11 moves in the manner indicated by the arrow $L_4$ against the doctor 37, the filtered material M' falls by the effect of gravity in the manner indicted by the arrow $L_5$ into a separate duct 38 passing down from the doctor 37. The conveyor 26 is situated at the bottom of the duct 38 as described above, and is advantageously a screw conveyor 27. The conveyor 26, 27 transfers the filtered and dewatered material M' further to a removing point in connection with a so-called barrier feeder 28. The function of the barrier feeder 28 is to act as a removing member, by means of which the filtered material is removed from the interior of the cover 20 or a corresponding portion of the pressure vessel. The barrier feeder 28 operates so that the material can be removed out of the interior of the pressure vessel without leakage of pressure.

When a vapor atmosphere is especially employed in the pressure space 29, the formation of carbonate is prevented, this carbonate blocking the pores in the filter plates 11 in conventional solutions. By the use of the method and equipment in accordance with the present invention, spreading of dust to the environment is also prevented. The carriage of toxic gases and vapors separated from the material to be filtered to the working premises is also prevented. According to the invention, by increasing the pressure, i.e. by producing a pressure higher than the atmospheric pressure in the pressure space 29 inside the cover 20, the capacity of the device is increased.

The higher the positive pressure that is produced, the higher the increase in the capacity. Even a positive pressure of 1 bar yields an approximately double capacity as compared with the case in which the filter plates are in the free outdoor air and at normal atmospheric pressure. According to the present invention, by using the suction valve 25, a sealed lead-in is formed for the shaft of rotation by means of the suction valve. A separate lead-in bearing is required at only one end of the drum. According to the present invention, by formation of the pressure vessel, the sludge basin for the material to be filtered is also formed at the same time.

An embodiment of the present invention is also possible in which a separate pressure duct 30 is not constantly used, but rather the pressure vessel is pressurized for each filtration, and during the filtration there are no connecting ducts passing into the pressure space. In other words, the pressure space 29 situated inside the cover 20 and surrounding the filter plates 11, is separately pressurized for each time of filtration.

The preceding description of the present invention is merely exemplary, and is not intended to limit the scope thereof in any way.

What is claimed is:

1. Apparatus for filtering, comprising
   at least one filter plate comprising a finely porous suction face having a pore size of about 0.05 to 2 microns arranged to be brought into contact with material to be filtered, saturated with liquid and hydraulically connected with liquid under negative pressure relative to the material to be filtered,
   a pressure-tight cover surrounding said at least one filter plate and defining a space into which positive pressure can be introduced for accelerating removal of liquid out of the material to be filtered,
   means for generating said negative pressure,
   said means comprising a duct communicating with an interior of said plate, and a valve mounted in said duct,
   said valve comprising a rotor part and a stator part, with said rotor part rotatably mounted to revolve along with said shaft and fitted inside said cover, and said stator part against which said rotor part is arranged to glide, being fitted in a stationary pressure-sealing position against said cover.

2. Apparatus according to claim 1, wherein said suction face is formed of ceramic material.

3. Apparatus for filtering, comprising
   a plurality of filter plates each comprising a finely porous suction face having a pore size of about 0.05 to 2 microns arranged to be brought into contact with material to be filtered, saturated with liquid and hydraulically connected with liquid under negative pressure relative to the material to be filtered,
   a pressure-tight cover surrounding each said filter plate and defining a space into which positive pressure can be introduced for accelerating removal of liquid out of the material to be filtered,
   a shaft upon which said filter plates are circumferentially mounted,
   a lower basin within said pressure tight cover into which said plates are arranged to pass along with rotation of said shaft, with the material to be filtered adhering to said faces of said plates by effect of said negative pressure and also rising along with rotation of said shaft and plates out of said basin, and into said pressure space within said cover above said basin by said negative pressure continuing to be applied, knives 18 or other detaching members situated at this point A of the structure, detach the material from the suction faces 11' and 11". After this, the dewatered material is shifted away, out of contact with the plates 11 and the device.

The structure further comprises a support frame D which is fitted to support the basin 16. The basin 16 is provided with an outlet pipe 19. The device further includes a storage tank for the material to be dewatered, which is further provided with an outlet duct. The central shaft of rotation and pipe are fitted to be rotated by a motor, preferably an electric motor.

According to the invention, the equipment comprises a cover construction 20 which is fitted to enclose and to define a space T with positive pressure. Advantageously, the cover structure comrpises an openable lid part 20a which can be attached to a bottom part 20b pressure tight, the bottom part 20b further functioning as the basin 16 for the material to be filtered.

In the suction dryer in accordance with the present invention, the suction faces expressly operate as suction faces saturated with liquid, which means that air (or gas in general) cannot pass through the suction face with the pressure differences between gas or steam or air and liquid that are employed in the dewatering method. In the suction dryer in accordance with the present invention, the object to be dewatered is brought through the suction face of the finely porous plate saturated with liquid, into hydraulic contact or connection with a liquid subjected to negative pressure relative to the object to be dewatered. The device is suitable for the dewatering and filtering of many different materials. Furthermore, it should be emphasized that instead of water, the liquid to be suctioned by means of the device in accordance with the present invention, may also be any other liquid whatsoever.

Figure 4A:
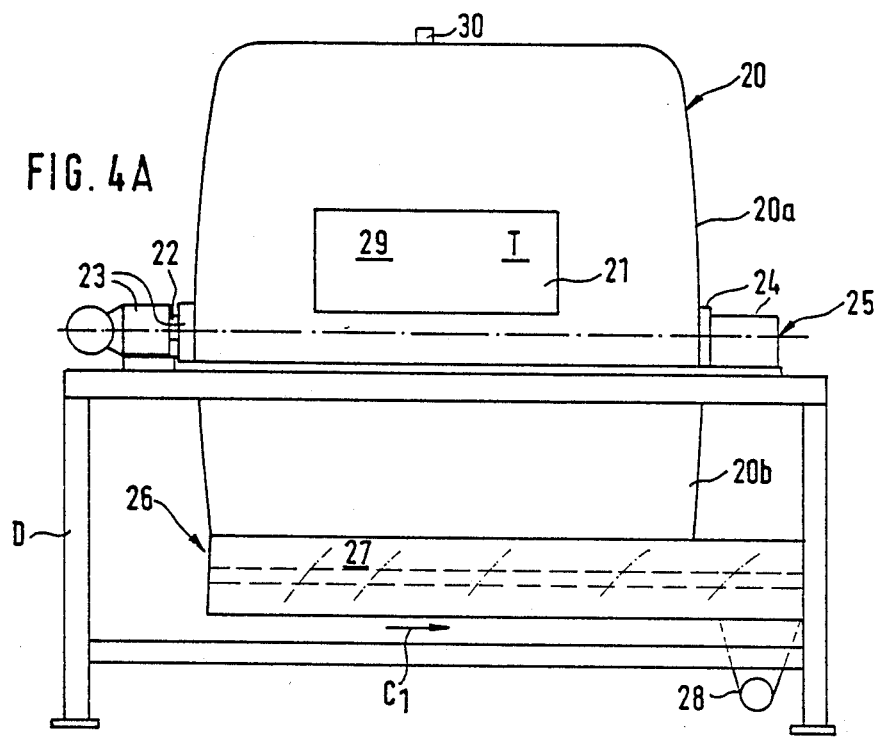
FIG. 4A is a side view of an advantageous embodiment of equipment in accordance with the present invention.
Figure 4B:
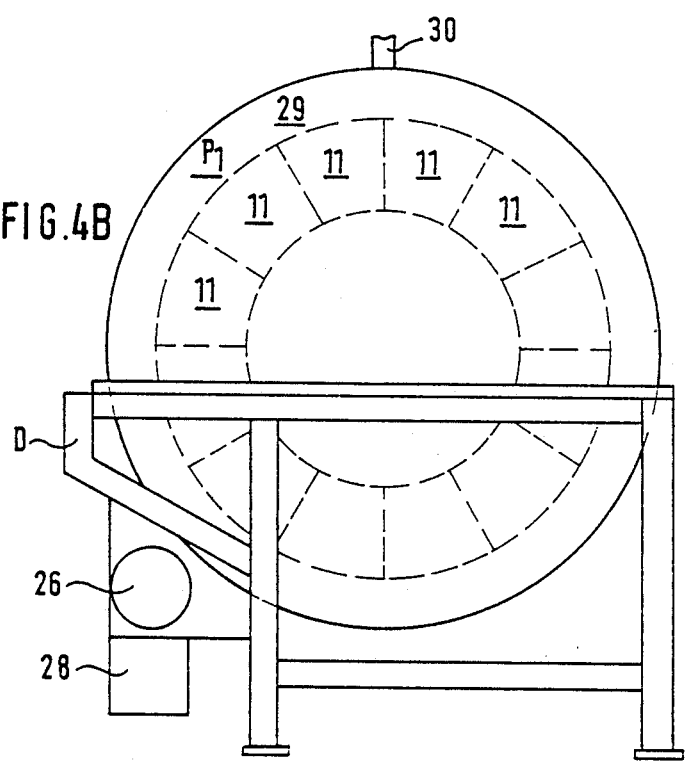
FIG. 4B illustrates the equipment of FIG. 4A as viewed in the direction of arrow $K_1$ in FIG. 4A.
Figure 4C:
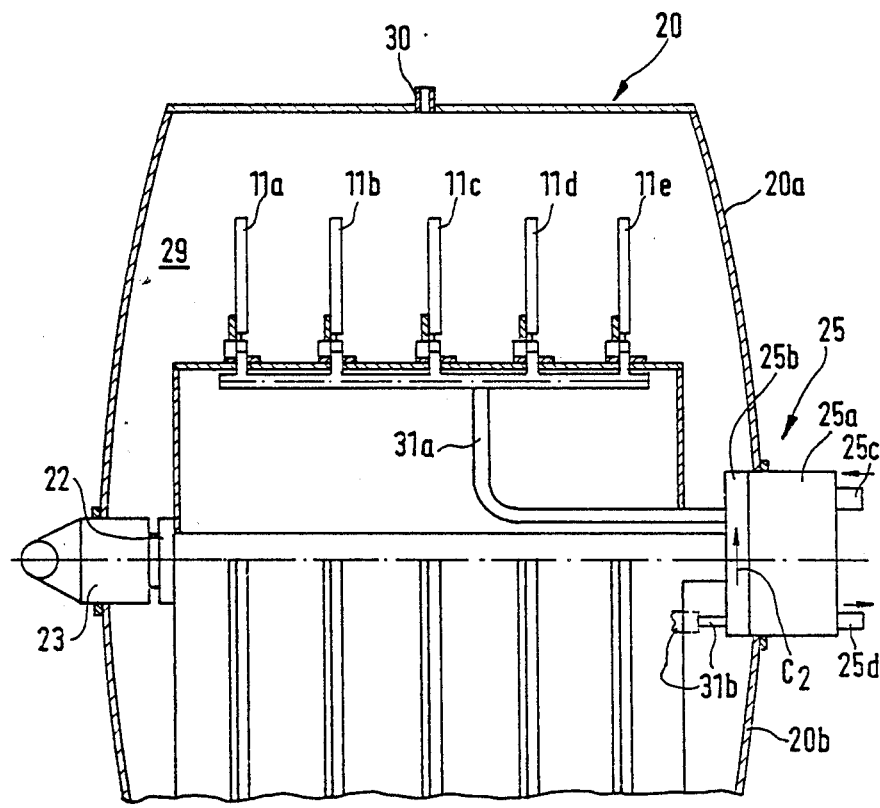
FIG. 4C is a sectional view along line I—I in FIG. 4A on enlarged scale, and partially illustrating principles of equipment in accordance with the present invention.

FIGS. 4A to 4C are more detailed illustrations of advantageous embodiments of the filtering equipment used in the filtering method in accordance with the present invention. FIG. 4A is a side view of the equipment. In FIG. 4A, the support frame is denoted by letter D. On the support frame D, the cover 20 is situated which encloses a space T. The cover 20 is pressure-tight and comprises an openable and removable upper part 20a which is attached to a lower part 20b by means of a flange 20c. The cover 20 includes an inspection hole 21 which is fitted to be advantageously situated in the upper part 20a of the cover 20.

Through the inspection hole 21, it is possible to observe the filtering process. The filter plates 11 are fitted inside the cover 20. The plates 11 are fitted to be displacable on a shaft 22. The shaft 22 is fitted to revolve on bearings 23 and 24. The take-offs of the shaft 22 through the cover 20 are sealed in such a manner that the positive pressure $p_1$ passed into the cover 20 is maintained at the desired value, and that no leakages take place through the joint between the shaft and the cover.

In FIG. 4A, reference numeral 26 denotes a conveyor by means of which the filtered and dewatered material is removed out of the device 10. The conveyor 26 is advantageously a screw conveyor. In the manner indicated by arrow $c_1$, the filtered and dewatered material is passed to the other end of the screw conveyor 27, where the material falls down by the effect of gravity into a so-called barrier feeder 28. By means of the barrier feeder 28, the filtered material M' can be transferred apart from the proximity of the end of the screw conveyor 27, without any leakage of pressure during the transfer away from the interior of the cover 20 to the open air.

The positive pressure $p_1$ is passed into the pressure space 29 above the sludge M to be filtered inside the cover illustrated in FIG. 4B. The material to be filtered is fitted in the lower part 20b of the cover, being fitted to be transferred from that location and to adhere to the filter plates 11 in accordance with the filtering stages. The material surface of the sludge to be filtered is denoted by C in FIG. 4B.

FIG. 4C is a sectional view of the equipment in accordance with the present invention as seen along line II—II in FIG. 4B. The equipment comprises a duct 30 through which the positive pressure is passed into the pressure space 29 inside the cover 20. In the most common embodiment of the present invention, in general a pressurized gas atmosphere, e.g. pressurized air, is introduced into the space 29. However, in the preferred embodiment of the invention, a vapor atmosphere is introduced into the pressure space.

In such a case, the use of oxygen is avoided and undesirable oxidation reactions are avoided. The function of the cover 20 is multiple. The cover 20 protects workers from gases and vapors evaporated from the material to be filtered. A further function of the cover 20 is to act as a pressure cover which permits generation of positive pressure in the pressure space 29 inside the cover 20. Under these circumstances, between the gas, air, or preferably, vapor in the space 29 and the liquid N to be suctioned out of the material M, a higher difference in pressure is produced than in cases in which the filter plates 11 are surrounded by the normal atmospheric pressure.

As shown in FIG. 4C, the equipment comprises several groups of filter plates, the groups 11a, 11b, 11c, 11d, and 11e being shown in the figure. Into the filter plates 11 situated in the same phase in each group 11a, 11b, ... of plates, a duct is passed from a distribution valve 25 through a system of ducts 31. Thus, for each group of plates, for the filter plates thereof situated in the same phase, there are connecting ducts 31a, 31b, etc. of their own. A duct 25c is further passed to the distributor valve 25, through which the liquid is suctioned off the material to be filtered and correspondingly a duct 25d passes to the valve 25. An inverse pressure can be applied through the duct 25d, thereby passing washing fluid into the filter plates 11.

The valve, i.e. the suction head 25, distributes the positive and negative pressure through a separate system of pipes to each filter plate 11 or groups of plates 11a, 11b, etc. According to the invention, such a valve 25 or suction head is used which comprises a stator part 25a and a rotor part 25b. The rotor part 25b revolves along with the shaft 22, and the stator parts 25a is in fixed position at the outer end of the shaft 22. The suction is passed through the fixed stator part 25a to the revolving and rotatable rotor part 25b, and through counter-openings provided in the rotor part 25b the negative pressure and the filtering stages are further distributed to the plates or plate groups to the ducts 31a, 31b, etc. When a cover construction 20 is used, the revolving rotor part 25b may be situated inside the cover construction 20. The cover construction 20b is sealed against the stationary stator part 25a. In this manner, a sealed take-off to the open air of the shaft is obtained from inside the cover 20. The other end of the shaft 22 of rotation only requires a pressure-tight separate journaling. The rotation of the rotor 25b is denoted at least one doctor mounted to remove filtered material from said faces of said plates as each said plate further moves into contact with said at least one doctor a conveyor arranged to receive the material removed by said at least one doctor which falls thereon by effect of gravity, and to transfer the material out from an interior of said apparatus within said cover, said filter plate comprising several groups of filter plates, each group comprising several filter plates and being rotatably mounted upon said shaft, and several doctors, each said doctor being positioned to remove material from plates in a respective group thereof, means for generating said negative pressure which comprise a duct communicating with an interior of each said plate, and a valve mounted in said duct, said valve comprising a rotor part and a stator part, with said rotor part rotatably mounted to revolve along with said shaft and fitted inside said cover, and said stator part against which said rotor part is arranged to glide, being fitted in a stationary pressure-sealing position against said cover.

4. Apparatus according to claim 3, wherein said suction faces are made of ceramic material.

* * * * *